Sept. 24, 1957 G. RAPP 2,807,678
AMPLIFIER FOR DIRECT CURRENTS OR FOR VERY LOW FREQUENCY CURRENTS
Filed Aug. 2, 1954
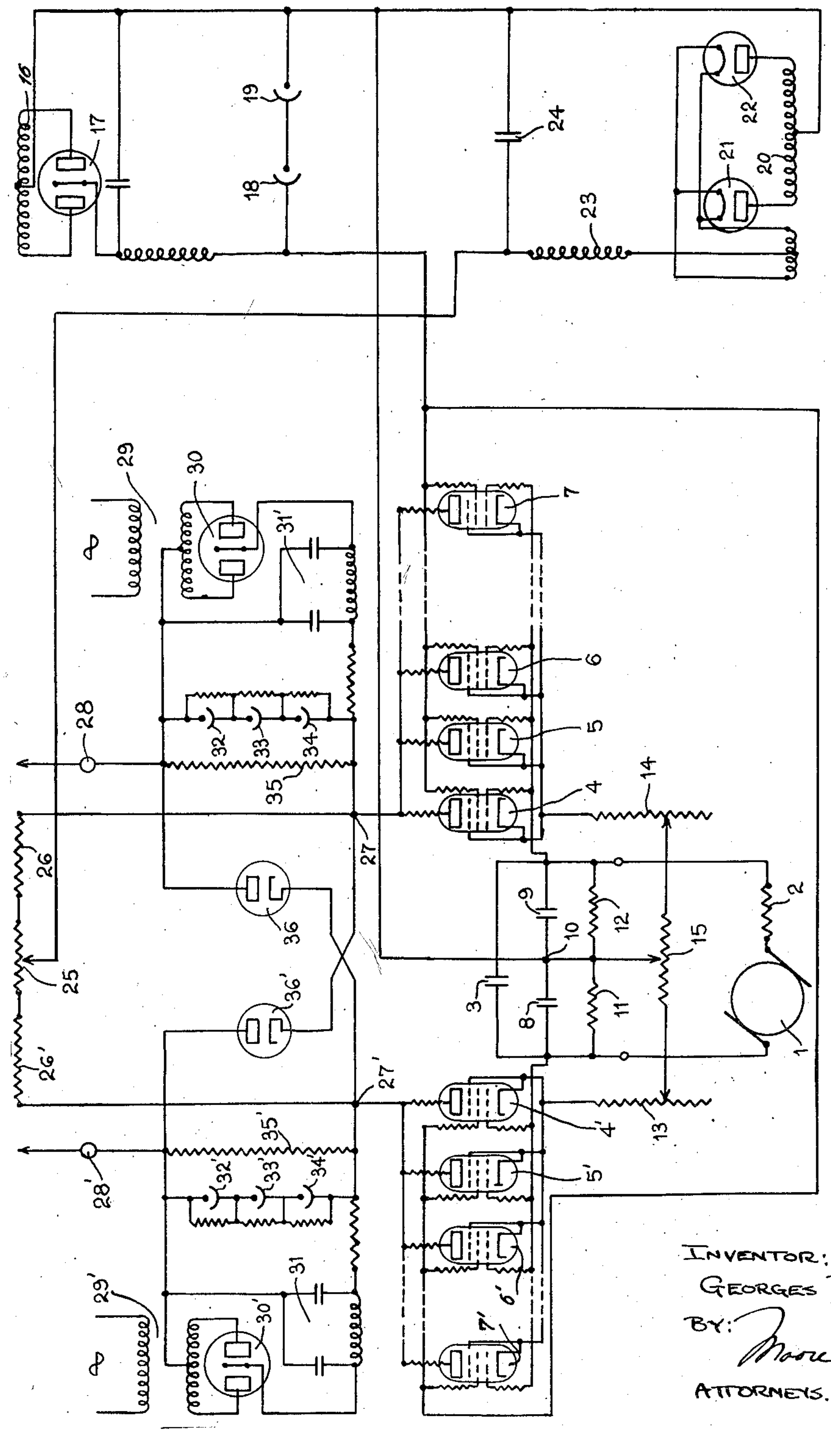
INVENTOR:
GEORGES RAPP
BY: Moore & Hall
ATTORNEYS.

2,807,678

AMPLIFIER FOR DIRECT CURRENTS OR FOR VERY LOW FREQUENCY CURRENTS

Georges Rapp, Vauban, Malakoff, France, assignor to Society Sirelec, Issy-les-Moulineaux, France, a body corporate of France Application August 2, 1954, Serial No. 447,131
Claims priority, application France June 30, 1954
5 Claims. (Cl. 179—171)

The present invention relates to a vacuum tube amplifier for direct currents or very low frequency currents, of the resistance type, and it aims particularly at providing an amplifier having a high stability for the zero and the gain of amplification also a small distortion, less for instance than 1% in the case of an output voltage ranging about 300 volts in a comparatively weak resistance, averaging some thousands ohms. This kind of amplifier is advantageously used in all the cases of amplification of direct currents or of very low frequency currents, and is particularly fit for use in special apparatus such as the electronic calculating machines, measuring and control apparatus, assemblies requesting very accurate servo-devices and the like.

One knows that the amplification of direct currents or of very low frequency currents is very difficult to carry out on account of the instability of the resistance amplifiers which results from the changes in the course of time of the characteristics of their constitutent parts, thus requiring a permanent supervision and adjustment of the zero and of the value of the gain of amplification. To cope with these difficulties, two vacuum tubes mounted in push-pull are generally used, thus allowing to eliminate by opposition some variations inasmuch as they are identical in the two branches of the push-pull and allowing in addition to obtain a linear characteristic. Nevertheless, in practice, two vacuum tubes are never strictly identical and their characteristics vary in different ways in the course of time so that a perfect steadiness cannot be gained through this mounting.

The present invention allows to solve this problem in a very satisfactory way and to obtain a distortion below 1% for the gain of amplification, linearity and amplitude even in the difficult case of an output circuit having a comparatively weak impedance. The amplifier according to the invention is characterized in that it consists of a push-pull circuit of two groups of a number of vacuum tubes connected in parallel in each group, the tubes being preferably selected in the same batch, the number of these tubes being a dependent variable of the greatest drift allowable during a given time.

As a matter of fact, by adjusting the total number of the tubes to the required degree of stability, one manages, according to the lows of statistics, to eliminate by balance the differences existing or appearing between the various tubes; nevertheless this number does not reach very high values, for instance 5 to 10 valves in each group, if care is being taken to select all the valves in the same batch, so as to have to eliminate only the variations likely to appear in a normal mass production.

By way of example, a form of embodiment of the amplifier according to the invention is described hereafter and illustrated in the annexed drawing.

The amplifier illustrated in Fig. 1 has been designed to amplify a unidirectional current with slow variations produced by a generator 1 and having to be dephased prior to the amplification. To this end, the generator 1 supplies the current to a circuit including a resistance 2 connected in series with a capacity 3 securing the necessary dephasing, and the potential difference obtained at the terminals of this condenser is applied to the inlet of the push-pull amplifier constituted by two groups of a number of pentodes 4, 5, 6, 7 . . . 4', 5', 6', 7' . . . connected in parallel in each group, each group including for instance ten pentodes. In order to apply the voltage to be amplified in opposition to the input circuits of the two groups of valves, a capacitive potential divider constituted by two identical condensers 8, 9 mounted in series but connected in parallel to the dephasing condenser 3 is provided, an artificial middle point 10 being thus created between these condensers 8, 9, and connected to the negative pole of the supply sources of the amplifier.

This capacitive divider offers, in addition to the easy formation of the middle point, the advantage of allowing to discard a strong impedance which otherwise should be necessary in the case of the generator 1, the voltage of which is to be amplified, having a weak output and a comparatively weak impedance to avoid an important drop of voltage. Furthermore, the condensers 8, 9 make it possible strongly to disconnect the input of the amplifier and to protect it against disturbing inductions without having to make use of shields.

To end, the condenser 3 shunting the condensers 8, 9, is of service, apart even of the dephasing of the voltage to be amplified, as it allows to reduce the importance of the two condensers 8, 9 connected in series.

The condensers 8, 9 are respectively connected with the control grids of the tubes 4—7 and 4'—7' of the two group of tubes, and strong resistances 11, 12 are mounted in parallel with these condensers to allow the return of the grid current.

The input circuit includes in addition, between the cathodes and the negative pole of the general supply, the adjustable resistances of negative feed-back 13 and 14 and the balancing resistance 15, this negative feed-back on the one hand increasing the stability of the amplifier and, on the other hand, allowing the adjustment of the gain of amplification through the adjustment of the value of the negative feed-back.

The voltage of the screen-grids of the amplifying tubes is obtained starting from the voltage supplied by a transformer illustrated by its secondary 16 supplying a double diode rectifying tube, the voltage of which is stabilized in a known way by the gas tubes 18, 19.

On the other hand, the supply of the anodes of the tubes 4—7, 4'—7' is obtained from the voltage supplied by a transformer 20 the secondary of which (alone illustrated) delivers the current in two rectifying diodes 21, 22 mounted so as to rectify the two alternations, a self 23 and a condenser 24 being provided in a known way to filter the rectified voltage which is applied to the anodes of the tubes through a balancing resistance 25 and the two anode resistances 26, 26' forming the output circuit.

When, to improve the linearity of the amplifier, a very high supply voltage is used, averaging several hundreds volts, the difference of high potential thus created between the output circuit and the input circuit risks to produce disturbing induction phenomena. According to the invention, this drawback is avoided by reducing the potential of the output circuit to a value very close to the value of the potential of the input circuit.

Therefore, continuous stabilized voltages having a suitable value are applied symmetrically and in opposition to the points 27, 27' of the output circuit so as to reduce to a minimum the difference of potential between the terminals 28, 28' (output terminals of the amplifier) and the negative pole of the installation to which the input circuit is connected. For this purpose, the voltages which are supplied by the transformers 29, 29', rectified by the double diodes 30, 30', carefully filtered by the filters 31, 31' and stabilized by the gas tubes 32, 33, 34 and 32', 33', 34', are applied to the terminals of the resistances 35, 35', respectively mounted between the points 27—28 and 27'—28'.

As it has been stated above, a high output voltage for the amplifier has been selected in order to increase the linearity. However, output voltages beyond the limits of the regular working of the amplifier, or dangerous for the utilization circuits can result therefrom. To meet this eventual drawback, a voltage limiter is provided in the output circuit, allowing to shunt said output circuit in case of the overvoltage of a previously fixed limitation of voltage. Therefore, the output circuit includes two rectifiers, for instance diodes 36, 36′ symmetrically mounted in shunt on the outputs of the two groups of tubes, 4—7, 4′—7′, the cathodes of which receive positive polarization voltages having the same value as said limiting voltage. Thus, as long as the limiting voltage has not been attained, the diodes prevent any current of flowing whilst, as soon as the limiting voltage has been reached, they shunt the output circuit, preventing the amplified voltage to overload this limiting voltage at the utilization terminals 28, 28′. According to the preferred form of embodiment illustrated by the drawing, the bias voltages of the limiting-rectifiers are taken from the compensating resistances 35, 35′ since the maximum output voltage foreseen ranges about the potential difference to be cancelled between the input and the output.

What I claim is:

1. An amplifier for direct currents and very low frequency currents including two groups of amplifying tubes, each of said groups comprising a plurality of tubes, means connecting in parallel the tubes of each group, means connecting the two groups of parallel connected tubes in push-pull with one another, means for applying to the anodes of the parallel-connected amplifying tubes in each of said groups a relatively high energization potential thereby to improve the linearity of the said amplifier, and means coupled to the output terminals of the said push-pull amplifier for applying two continuous symmetrical voltages in opposition to said energization potential thereby to reduce the relatively high difference of potential between the output and input of said push-pull connected groups.

2. An amplifier for direct currents and very low frequency currents including two groups of amplifying tubes, each of said groups comprising a plurality of tubes, means for connecting in parallel the tubes of each group, means for mounting in push-pull the two groups of parallel-connected tubes, means to apply to the anodes of the amplifying tubes a relatively high energization potential thereby to improve the linearity of the amplifier, and means to apply symmetrically and in polarity opposition to the terminals of the output circuit of the push-pull amplifier two continuous voltages so as to reduce the relatively high difference of potential between the output circuit and the input circuit, said last-named means comprising for each group of tubes a source of high alternating voltage, rectifiers and filters coupled to said source for obtaining a direct voltage, means for stabilizing said voltage, and a resistance for coupling an output terminal to said amplifier, said stabilized voltage being applied across said resistance.

3. An amplifier for direct currents and very low frequency currents including two groups of amplifying tubes each of which comprises a plurality of amplifying tubes, means for connecting in parallel the tubes of each group, means for connecting in push-pull the two groups, means to apply to the anodes of the amplifying tubes comprising each group a relatively high energization voltage to improve the linearity of the amplifier, a pair of output terminals, and means coupling said output terminals to said amplifier, said last-named means including means applying potentials in opposition to said energization voltage between the said output terminals and the said push-pull amplifier thereby to reduce the relatively high difference in potential between the output circuit and the input circuit of said amplifier, a voltage limiter in the output circuit of the push-pull amplifier and comprising two rectifiers, respectively oppositely mounted in parallel with said output circuit, and means for applying to the cathodes of said rectifiers a positive polarization voltage the value of which is equal to the value of the required limiting voltage.

4. An amplifier for direct currents and very low frequency currents including two groups of amplifiers each of which comprises a plurality of amplifying tubes, means for connecting in parallel the tubes of each group, means for mounting in push-pull the two groups, means to apply to the anodes of the amplifying tubes a relatively high energization potential thereby to improve the linearity of the amplifier, an output circuit having a pair of output terminals, and means to apply symmetrically in opposition to the terminals of the output circuit of the push-pull amplifier two continuous voltages so as to reduce the high difference of potential between the output circuit and the input circuit, said means comprising for each group a source of high alternating voltage, rectifiers and filters coupled to said source for transforming it to a direct voltage, gas tubes coupled to said direct voltage for stabilizing said voltage, two resistances to the terminals of which are applied said stabilized voltages, said resistances being symmetrically connected to the said output circuit of the said amplifier, a voltage limiter arranged in the output circuit of the amplifier and comprising two rectifiers respectively oppositely mounted in parallel with said output circuit, and means to apply to the cathodes of said rectifiers positive polarization voltages taken respectively from the said two resistances.

5. An amplifier for direct currents and very low frequency currents including two groups of amplifiers each of which comprises a plurality of amplifying tubes, means for connecting in parallel the tubes of each group, means for mounting in push-pull the two groups, a common input circuit for said amplifier comprising a voltage divider formed by two condensers connected in series, their middle point being connected to the neutral point of the push-pull circuit, a third condenser mounted in parallel with said two condensers, negative feedback resistances mounted in the input circuit of the amplifier between the said neutral point and the common cathodes of each group, means to apply to the anodes of the amplifying tubes a relatively high energization voltage to improve the linearity of the amplifier, means for symmetrically applying in opposition to the terminals of the output circuit of the push-pull amplifier two continuous voltages so as to decrease the high difference of potential between the output circuit and the input circuit, said last-named means comprising for each group a source of high alternating voltage, rectifiers and filters coupled to said source to transform it into a continuous voltage, a plurality of gas tubes connected to stabilize said voltage, two resistances at the terminals of which said stabilized voltages are applied, said resistances being symmetrically connected to the output circuit of the amplifier, a voltage limiter arranged in the output circuit of the amplifier and comprising two rectifiers, respectively oppositely mounted in parallel with the output circuit, and means to apply to the cathodes of said rectifiers high positive polarization voltages respectively taken from the said two resistances.

References Cited in the file of this patent

UNITED STATES PATENTS

| | | |
|---|---|---|
| 2,431,973 | White | Dec. 2, 1947 |
| 2,540,817 | Forster | Feb. 6, 1951 |
| 2,597,520 | O'Brien | May 20, 1952 |
| 2,605,333 | Job | July 29, 1952 |
| 2,646,472 | Rockwell | July 21, 1953 |

OTHER REFERENCES

Publication: Audio, April 1954, pages 19, 20. "Some Experiments with Miniature Power Triodes," by Geoffrey H. Creg.